(12) United States Patent
Marcroft

(10) Patent No.: US 12,135,953 B2
(45) Date of Patent: Nov. 5, 2024

(54) SYSTEMS, METHODS, AND DEVICES FOR THE SORTING OF DIGITAL LISTS

(71) Applicant: Kyle Marcroft, Redmond, WA (US)

(72) Inventor: Kyle Marcroft, Redmond, WA (US)

( * ) Notice: Subject to any disclaimer, the term of this patent is extended or adjusted under 35 U.S.C. 154(b) by 252 days.

(21) Appl. No.: 17/274,753

(22) PCT Filed: Feb. 19, 2020

(86) PCT No.: PCT/US2020/018844
§ 371 (c)(1),
(2) Date: Mar. 9, 2021

(87) PCT Pub. No.: WO2020/172290
PCT Pub. Date: Aug. 27, 2020

(65) Prior Publication Data
US 2022/0050664 A1     Feb. 17, 2022

Related U.S. Application Data

(60) Provisional application No. 62/835,326, filed on Apr. 17, 2019, provisional application No. 62/817,022, filed on Mar. 12, 2019, provisional application No. 62/807,557, filed on Feb. 19, 2019.

(51) Int. Cl.
*G06F 7/24* (2006.01)
*G06F 16/901* (2019.01)

(52) U.S. Cl.
CPC ............ *G06F 7/24* (2013.01); *G06F 16/9024* (2019.01)

(58) Field of Classification Search
CPC .............................. G06F 7/24; G06F 16/9024
See application file for complete search history.

(56) References Cited

U.S. PATENT DOCUMENTS

| 395,781 A | 1/1889 | Hollerith | |
|---|---|---|---|
| 2008/0209183 A1* | 8/2008 | Rider | G06F 7/74 712/E9.016 |
| 2009/0177657 A1* | 7/2009 | Carroll | G06F 7/24 |
| 2010/0121848 A1* | 5/2010 | Yaroslavskiy | G06F 16/289 707/E17.104 |
| 2014/0207836 A1* | 7/2014 | Mundarath | G06F 7/026 708/207 |
| 2014/0279856 A1* | 9/2014 | Srinivasan | G06F 16/23 707/609 |

FOREIGN PATENT DOCUMENTS

GB          190119372 A      5/1902

OTHER PUBLICATIONS

Franceschini et al., "Radix Sorting With No. Extra Space" (Year: 2018).*
Planeta, "Pbit and other list sorting algorithms" (Year: 2018).*
Duvanenko, "Algorithm Improvement through Performance Measurement: Part 2 | Dr Dobb's" (Year: 2009).*
Bob John, "Can someone please explain how this implementation of bucket sort works?" (Year: 2013).*

(Continued)

*Primary Examiner* — Farley Abad

(57) ABSTRACT

Systems, methods, and devices for the sorting of digital lists based on the binary components of their elements.

16 Claims, 12 Drawing Sheets

(56) References Cited

OTHER PUBLICATIONS

Robert Hill, "How do I calculate the optimal number of buckets when implementing bucket sort followed by insertion sort?" (Year: 2016).*
Adam, "How to split a list into pairs in all possible ways" (Year: 2011).*
Knuth, Donald. 1997. The Art of Computer Programming, vol. 3: Sorting and Searching, Third Edition. Addison-Wesley, Section 5.2.5: Sorting by Distribution, pp. 168-179.
Skarupke, Malte. Dec. 28, 2016. "I Wrote a Faster Sorting Algorithm" www.probablydance.com.
Gorset, Erik. Apr. 26, 2011. "Is radix sort faster than quicksort for integer arrays?" www.erik.gorset.no.
Ross, Steven. 2014. "Function template integer_sort" www.boost.org.
Sedgewick, R. 1998. "Algorithms in C++", third edition, 1998, p. 424-427.
Duvanenko, Victor J. Oct. 1, 2009. "Algorithm Improvement through Performance Measurement: Parts 2-4" www.drdobbs.com.
Duvanenko, Victor J. Jan. 14, 2011. "Parallel In-Place Radix Sort Simplified" www.drdobbs.com.

\* cited by examiner

```
import random numBits = 2
poweredBits = 4 # = 2 ^ numBits
mask = 0x03 # 2 bit mask def makeRandomList(size, maxValue, minValue = 0):
    result = [random.randint(minValue, maxValue) for i in range(size)]
    return result def checkOrder(thisArray):
    for index in range(1, len(thisArray)):
        if thisArray[index - 1] > thisArray[index]:
            print("Error: " + 'index ' + str(index-1) + ' value ' + str(thisArray[index - 1])
                + ' is greater than next index value of ' + str(thisArray[index]))
            return False
    return True def getIntraValue(value, shiftBits):
    result = value & (0x03 << shiftBits)
    #print('value-> ' + str(bin(value)) + " - " + str(bin(mask)) + " <- mask - lowOrderBit -> " +
    str(lowOrderBit))
    result = result >> shiftBits
    #print('result: ' + str(bin(result)) + ' ~ ' + str(result))
    return result def makePointers(pointers, counts, begin):
    pointerCount = 0
    summation = 0 + begin for index, amount in enumerate(counts):
        if amount <= 0:
            pointers[index] = -1
            continue
        pointers[index] = summation
        summation += amount
        pointerCount += 1 return summation
```

FIG. 5A

```
def makeCounts(arr, begin, end, counts, shiftBits):
    for index in range(begin, end):
        lowerIntra = getIntraValue(arr[index], shiftBits)
        counts[lowerIntra] += 1 def findNextActivePointer(pointers):
    for i in range(0, len(pointers)):
        if pointers[i] != -1:
            return i
    return -1 def printVitals(arrList, pointers, next, prev, currentPointer, sumCounts):
    '''print('pointers:   ' + str(pointers))
    print('Next:       ' + str(next))
    print('Prev:       ' + str(prev))
    print('CurrPointer: ' + str(currentPointer))
    print('sumCounts:  ' + str(sumCounts))
    print('ArrayList:  ' + str(arrList))
    print('*****************************************')''' def resolveLoop(arrList, pointers, next, prev, currentPointer, sumCounts):
    backupPointer = currentPointer
    printVitals(arrList, pointers, next, prev, currentPointer, sumCounts)
    temp = arrList[pointers[currentPointer]]
    while next[prev[currentPointer]] != -1:
        cpNext = next[currentPointer]
        cpPrev = prev[currentPointer]
        cpTargetIndex = pointers[currentPointer]
        cpPrevTargetIndex = pointers[prev[currentPointer]]
        cpListValue = arrList[pointers[currentPointer]]
        cpPrevListValue = arrList[pointers[prev[currentPointer]]]
        arrList[cpTargetIndex] = arrList[cpPrevTargetIndex]
        currentPointer = prev[currentPointer]
        pointers[next[currentPointer]] += 1
        if pointers[next[currentPointer]] >= sumCounts[next[currentPointer]]:
            pointers[next[currentPointer]] = -1
        next[next[currentPointer]] = -1
        prev[next[currentPointer]] = -1 arrList[pointers[currentPointer]] = temp
    next[currentPointer] = -1
    prev[currentPointer] = -1
    pointers[currentPointer] += 1
    if pointers[currentPointer] >= sumCounts[currentPointer]:
        pointers[currentPointer] = -1
```

FIG. 5B

```
def exploreLinkedList(arrList, pointers, next, prev, currentPointer, sumCounts, lsb,
newCounts):
    global numBits
    done = False
    originalPointer = currentPointer
    while not done:
        # check if we need a new current pointer
        if pointers[currentPointer] == -1:
            currentPointer = findNextActivePointer(pointers)
            if currentPointer == -1:
                done = True
                break upperIntra = getIntraValue(arrList[pointers[currentPointer]], lsb)
        if lsb >= numBits:
            lowerIntra = getIntraValue(arrList[pointers[currentPointer]], lsb - numBits)
            newCounts[upperIntra][lowerIntra] += 1 next[currentPointer] = upperIntra
        continueFlag = False
        while next[currentPointer] == currentPointer:
            pointers[currentPointer] += 1
            if pointers[currentPointer] >= sumCounts[currentPointer]:
                # this pointer is finished
                next[currentPointer] = -1
                pointers[currentPointer] = -1
                continueFlag = True
                break
            upperIntra = getIntraValue(arrList[pointers[currentPointer]], lsb)
            if lsb >= numBits:
                lowerIntra = getIntraValue(arrList[pointers[currentPointer]], lsb - numBits)
                newCounts[upperIntra][lowerIntra] += 1
            next[currentPointer] = upperIntra
        if continueFlag:
            continue if next[next[currentPointer]] != -1:
            backupPrevious = prev[next[currentPointer]]
            backupPointer = next[currentPointer]
            prev[next[currentPointer]] = currentPointer
            resolveLoop(arrList, pointers, next, prev, next[currentPointer], sumCounts)
            currentPointer = backupPointer
            prev[currentPointer] = backupPrevious
            continue
        else:
            prev[next[currentPointer]] = currentPointer
            currentPointer = next[currentPointer]
```

FIG. 5C

```
def lastLevel(arrList, begin, oldCounts, lsb):
   global poweredBits
   mask = 0x03 next = [-1] * poweredBits
   prev = [-1] * poweredBits
   pointers = [-1] * poweredBits
   sumCounts = [0] * poweredBits
   newCounts = [[0 for i in range(poweredBits)] for j in range(poweredBits)]
   end = makePointers(pointers, oldCounts, begin)
   summation = 0 + begin
   for index, item in enumerate(oldCounts):
      summation += item
      sumCounts[index] = summation
   done = False
   currentPointer = findNextActivePointer(pointers)

exploreLinkedList(arrList, pointers, next, prev, currentPointer, sumCounts, lsb, newCounts)

def generalLevel(arrList, begin, oldCounts, lsb):
   global poweredBits
   global numBits
   mask = 0x03 next = [-1] * poweredBits
   prev = [-1] * poweredBits
   pointers = [-1] * poweredBits
   sumCounts = [0] * poweredBits
   newCounts = [[0 for i in range(poweredBits)] for j in range(poweredBits)]
   end = makePointers(pointers, oldCounts, begin)

sumBegin = 0 + begin
   for index, item in enumerate(oldCounts):
      sumBegin += item
      sumCounts[index] = sumBegin currentPointer = findNextActivePointer(pointers)
   if currentPointer == -1:
      done = True
```

FIG. 5D

```
exploreLinkedList(arrList, pointers, next, prev, currentPointer, sumCounts, lsb, newCounts)

sumBegin = 0 + begin;
   for i in range(len(oldCounts)):
      if (oldCounts[i] > 0):
         '''print('Start level ' + str((lsb - numBits) / 2))
         print('arrList: ' + str(arrList))
         print('sumBegin: ' + str(sumBegin))
         print('oldCounts[' + str(i) + ']: ' + str(oldCounts[i]))
         print('newCounts[' + str(i) + ']: ' + str(newCounts[i]))
         print('lsb: ' + str(lsb))
         print('numBits: ' + str(numBits))
         print('===================================================================')'''
         if lsb == 2:
            lastLevel(arrList, sumBegin, newCounts[i], lsb - numBits)
         else:
            generalLevel(arrList, sumBegin, newCounts[i], lsb - numBits)
         sumBegin += oldCounts[i]

def preLevel(arrList):
   global poweredBits
   begin = 0
   end = len(arrList)
   counts = [0] * poweredBits
   for index in range(begin, end):
      upperIntra = getIntraValue(arrList[index], 6)
      counts[upperIntra] += 1
   generalLevel(arrList, 0, counts, 6)

def sortRandomList():

arrList=makeRandomList(10000000, 255, 0)
   print(str(len(arrList)))
   print('**************************')
   preLevel(arrList)
   print(str(checkOrder(arrList)))
   print(str(len(arrList)))

sortRandomList()
```

FIG. 5E

SYSTEMS, METHODS, AND DEVICES FOR THE SORTING OF DIGITAL LISTS

This application claims priority to and/or the benefit of U.S. provisional patent application Ser. No. 62/835,326 filed Apr. 17, 2019, U.S. provisional patent application Ser. No. 62/817,022 filed Mar. 12, 2019, and U.S. provisional patent application Ser. No. 62/807,557 filed Feb. 19, 2019. The foregoing applications are incorporated by reference in their entirety as if fully set forth herein.

TECHNICAL FIELD

This invention relates generally to systems, methods, and devices for efficiently and expediently sorting digital lists. Specific details of certain embodiments of the invention are set forth in the following description and in the figures to provide a thorough understanding of such embodiments. The present invention may have additional embodiments, may be practiced without one or more of the details described for any particular described embodiment, or may have any detail described for one particular embodiment practiced with any other detail described for another embodiment.

BACKGROUND ART

In the field of computer science, a sorting algorithm is an algorithm that is configured to take a given list, typically in array form, and output a list wherein the elements of the original list are put into a certain order, such as, but not limited to, in numerically ascending or descending order for a list comprised of number elements. While simple in description, the problem of efficient sorting is notably complex, and there are numerous different algorithms that represent various approaches to the sorting problem, each with their own strengths and weaknesses. In some computer languages, a "list" is different from an "array" but for the purposes of this application herein the terms refer to a collection of elements which may or may not be equal in value. The elements do not necessarily have to be homogenous, and may, for example, be elements comprised of various numbers of encoding binary bits.

Among the most fundamental tasks in the operation of a computer system is the sorting of lists, the process of arranging a set of similar pieces of information into a desired order. The vast majority, if not virtually all, database programs employ sorting algorithms, they are also used in other applications including compliers, interpreters, and operating systems. Due to the fundamental importance of sorting algorithms in the operation of computers, making them as efficient as possible improves the performance of computer systems overall.

When analyzing a sorting algorithm, the amount of computing resources required to execute the algorithm are pivotal to its efficiency. Those skilled in the relevant art will be familiar with what is called "Big O" notation, a means of mathematically expressing the complexity of an algorithm in terms of factors such as a time complexity and space complexity. In the case of time complexity, algorithms can be further granularly classified base on their worst, best, and average case scenario, with a worst case scenario being particular to a given algorithm such as a list designed specifically to require the most number of operations for that algorithm, while the best case may be a list that is already sorted. Big O notation estimates complexity in an asymptotic sense; estimating the efficiency for a reasonably large length of input. Generally, for sorting algorithms, the best case scenario, where the list provided is already sorted, would result in O(n). However, most algorithms achieve at best an O(n log n) time complexity for their average and worst-case scenarios.

A sorting algorithm can be said to have a growth rate on the order of a mathematical function, if, beyond a certain input size n, the function of f(n) times a positive constant provides an upper bound or limit for the run-time of the sorting algorithm. Put another way, for a given input size n greater than some number and a constant c, the algorithm will run no slower than c*f(n). This concept is what is described by the Big O notation. As an example, if the run-time of a given sorting algorithm grows quadratically as its input size increases, the sorting algorithm is described to be $O(n^2)$.

Sorting algorithms are also categorized by their space complexity, wherein the space complexity increases based on the amount of memory required beyond the amount used by the list being sorted. If, for example, the sorting algorithm created a second copy of the list as it was sorting, the space complexity would double. On the other hand, for lists that swap values as they sort or utilize a "sort in-place" mechanism, the space complexity is equal to, or is so close that the difference is negligible, the size of the original list. The present invention, as an in-place sorting mechanism, utilizes a constant amount of memory.

Common sorting algorithms known in the art include Quicksort (sometimes referred to as a partition-exchange sort), mergesort, and Bucket sort. Frequently they utilize a "divide and conquer" approach by breaking the array into smaller components and sorting them iteratively until the full list is sorted. In the case of Quicksort, a pivot value is selected from the array, and the elements of the array are then moved one-by-one into two sub-arrays, with one sub-array comprised of elements greater than the pivot, and the other comprised of elements less than the pivot. The Quicksort Algorithm then repeats this process recursively, selecting new pivots in the sub-arrays, and essentially swapping the places of elements in the list until they are sorted.

In the case of mergesort, a given array is broken down into individual elements, which are then compared to their adjacent element to form a sub-list comprised of two sorted elements. The resulting pair lists are then compared to their adjacent pair sub-lists and sorted once more. The algorithm repeats this process with progressively larger sub-lists until the full array is sorted.

In addition, the present invention resembles Bucket sort, sometimes referred to as a "bin sort." In a Bucket sort, the algorithm first sets up a number of "buckets" in which it will place elements. For example, if the numbers are integers ranging from 1-50, there may be five buckets split into value increments of ten (e.g. 1-10, 11-20, 20-30, and so on). The algorithm then proceeds through the original array, placing each element it encounters into the appropriate bucket. The algorithm then sorts the buckets simultaneously. Some embodiments of the algorithm will also check to confirm that a bucket has at least two elements inside it before attempting to sort the bucket, allowing it to potentially ignore empty buckets, or buckets that are comprised of a single element and are thus sorted by definition. Finally, the algorithm moves through each ascending bucket, placing the elements from the lowest value bucket into the array in order, and repeating with ascending value buckets until the final list is produced.

The present invention incorporates some aspects of each of the above lists, however it differs in several key ways, leading to its increased efficiency in terms of time and space, as compared to any individual sorting method.

Also important to the present disclosure and invention is the method of encoding values in digital lists. Typically, the values in a digital list are encoded using a binary format. In such a format, the number of binary figures used determines the maximum value possible. For example, a binary system that used five bits, where the low-order (rightmost in this case) bit represents a value of 1, and each value doubles beyond that, is capable of representing a maximum value of 31 (16+8+4+2+1). The present invention can also be configured to function with alternative encoding mechanisms, depending on the needs of the user.

SUMMARY OF THE INVENTION

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present invention exploits the binary encoding of values within a known range of potential values, within a list of a known length, with the result of an O(n) time complexity which is dictated by the length of the list multiplied by a constant value, and an O(1) space complexity because the invention utilizes a "sort in place" method. The present invention is a non-comparison sort, in that it does not directly compare the values of the individual elements to each other. The system involves examining the binary bits that encode each elements, and as such, the time it takes to run the algorithm is dictated by the length of the list to be sorted (N), the maximum number of binary digits used to encode the values (K), and the constant factor based on the computing overhead of the implementation (J). As written, it would result in a time complexity of O(NKJ); and where N goes to infinity K and J become negligible and can drop out, resulting in a time complexity of O(N).

The invention considers that when comparing different binary numbers all numbers can be partitioned based on the binary digits. For example, take the list {1110, 1011, 1100, 1010}; all four elements have an active high-order bit, but two of them have an inactive second bit, and two have an active second bit. Due to the nature of binary numbers, it is guaranteed that the value of the two elements with the second bit active will be greater than the value of the two elements with the second bit inactive. Thus the list can be partitioned into two sub-lists comprised of {1011, 1010} and {1110, 1100} respectively. Those lists can summarily be partitioned into smaller lists by looking at the third bit, knowing that, with respect to an element's current list elements with the same higher order bits, but different third bits, will be comparable in value. So, utilizing the above lists, the first list {1011, 1010} has the third bit active for both values, so no change is made. However, the second list {1110, 1100} has one element with the third bit active and one with it inactive. The system can then further partition that list into another list, resulting in three total lists: {1011, 1010}, {1100}, and {1110}. Furthermore, by always moving the highest order bit active elements to the right (or whatever direction the implementor has deemed indicates a higher value), and then moving subsequent order bits one step left (or such direction indicates a lower value) of the predecessor bit (as demonstrated in the order of the list in the foregoing sentence) it holds true that all lists to the left are comprised of lower value elements than the list on the right.

The system can then repeat the process for the lowest order bit, in this case the fourth order bit, and will split the last remaining multi-element list in two, creating four lists when it moves the element with the fourth order bit active to the right of its current list but left of the lowest list created by having the second order bit active. The final order is thus: {1010}, {1011}, {1100}, and {1110}. As is demonstrated, each list is ultimately reduced to either a single element, or to multiple equal elements, both of which are value sorted lists by definition. Put another way, if the original list had no copies of a number, then no final set would contain that number; if the original list had one copy of a number, then one final set would contain one copy of that number; if the original list had multiple copies of a number, then one final set would contain all copies of that number. As such, the present invention does not compare the values, but instead relies upon the position of the lists and the bits that encode the lists in order to sort.

While the above example utilized integers, there is no restriction on the present invention being utilized with decimal or negative numbers as well, and a practitioner skilled in the art would easily be able to modify an implementation to do so. The same is true of elements comprised of a variable number of bits with a fixed upper limit. Furthermore, while the above example assumes a left-to-right ascending order of value, a practitioner could easily adapt the algorithm to operate in the reverse, or such other order as necessary.

This invention of systems, methods, and devices for the sorting of digital lists relates generally to algorithmically sorting digital lists, and more specifically the sorting lists of binary-based values. Specific details of certain examples of the system for the sorting of digital lists are set forth in the following description and in the figures to provide a thorough understanding of such examples. The present invention may have additional examples, may be practiced without one or more of the details described for any particular described example, or may have any detail described for one particular example practiced with any other detail described for another example. Many of the attendant features will be more readily appreciated as the same becomes better understood by reference to the following detailed description considered in connection with the accompanying drawings.

BRIEF DESCRIPTION OF DRAWINGS

The present description will be better understood from the following detailed description read in light of the accompanying drawings, FIGS. 1-6, wherein:

FIGS. 5A-5E show the source code of an example implementation of the invention in the Python scripting language according to an embodiment of the invention.

DETAILED DESCRIPTION OF THE PREFERRED EMBODIMENTS

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a new system and method for sorting digital lists. Although the present examples are described and illustrated herein as being implemented in an integer sorting system, the system described is provided as an example and not a limitation. As those skilled in the art will appreciate, the present examples are suitable for application in a variety of different types of sorting systems.

Figure 1:
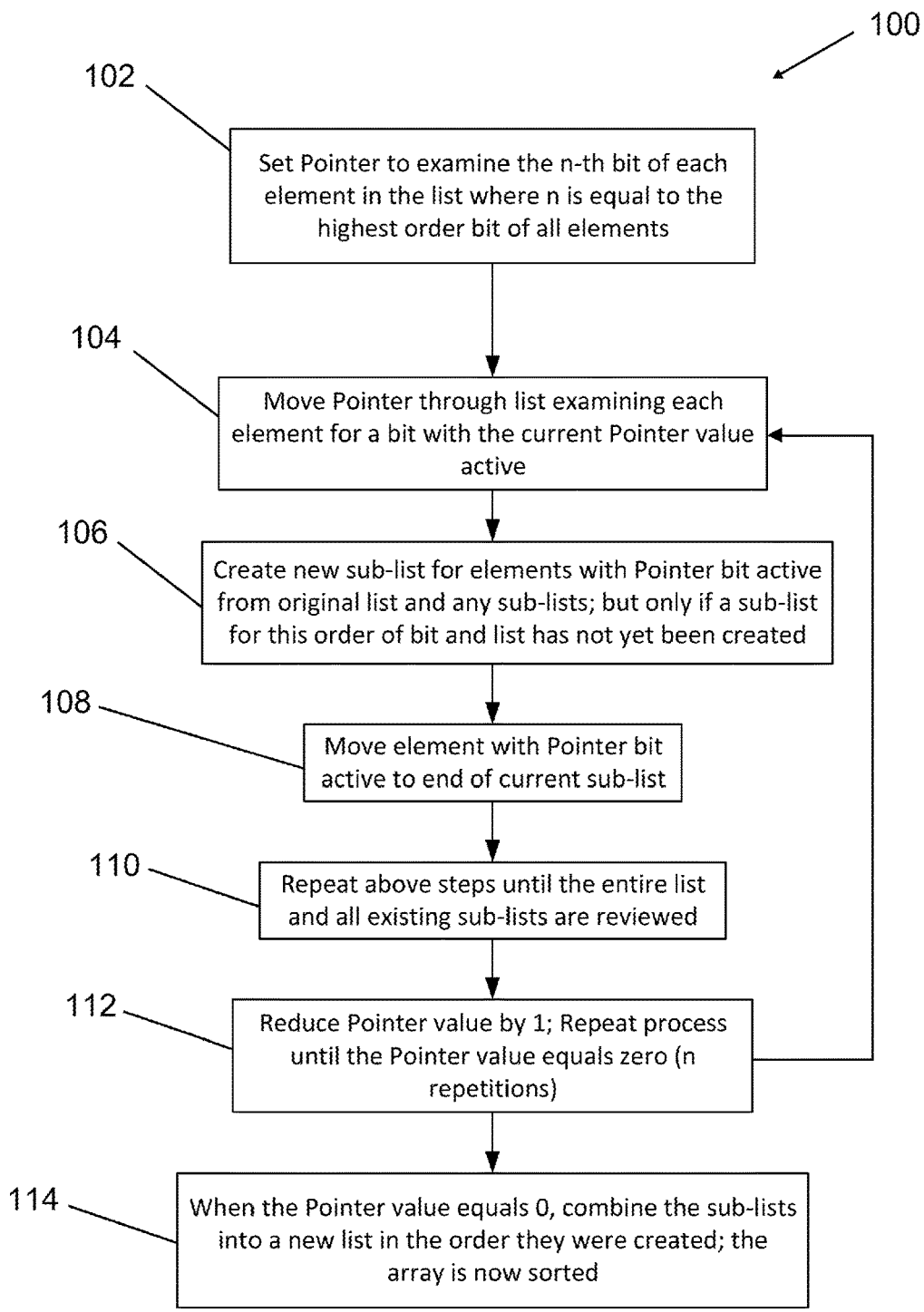
FIG. 1 is a flowchart for a sorting algorithm according to an embodiment of the invention.

FIG. 1 is a block diagram showing a basic flow of the algorithm 100 as it sorts an array. First step 102, the algorithm sets a Pointer to examine the n-th bit of a binary encoded element of a list. For example, for elements encoded in four bits, it would examine the fourth and highest order bit. The algorithm then proceeds through the array for step 104, moving the pointer to examine the highest order bit until it encounters a bit that is active (typically denoted as a bit set to 1 instead of 0). When it encounters that active bit for step 106, it creates a sub-list and moves the element with the active bit to the end of that sub-list as step 108. In some embodiments, it may be preferable to more the element to the beginning of a sub-list, or to an x-1 position wherein x is the position of the last element moved to the sub-list. This sub-list creation process can alternatively happen at the beginning of the algorithm, or can be postponed until the active bit is found.

The algorithm then proceeds sequentially through the original list, moving each element it encounters with the current examined bit active to the current sub-list as step 110. Once it reaches the end of the process, there should be an original list and the sub-list, the latter containing the entirety of the elements with the bit the Pointer was designated to check set to active.

The algorithm then reduces the order of bit the Pointer is examining by one, step 112, so in the case of a four order encoding, the Pointer would now be set to the third bit. Then algorithm then repeats the original process; examining each element on the original list and any existing sub-lists in order (or in some embodiments multiple copies of the algorithm can run pointers on each list simultaneously), and moving any encountered elements to a new sub-list. However, when it is examining a sub-list, instead of moving elements encountered to the sub-list the algorithm created for the original list, it instead creates an additional sub-list for elements that came from each existing sub-list. So, for example, if the first pass of the algorithm created a sub-list with two elements, and one of those elements had the third order bit set to active, that element would be moved from the first sub-list to a new one, set between the originally created sub-list and the original list.

Finally, the algorithm terminates when the Pointer value is set to zero at step 114, meaning it has examined each order of bits attached to the elements. At this time, the original list should be empty and the algorithm can combine all of the sub-lists into a sorted list.

In some embodiments of the algorithm the system can add a further "counting" sort method to the beginning of the algorithm in order to streamline the process. If sorting a list into two distinct sets of values, one set all greater than the other, then one can further sort those two subsets based on a next lower set of contiguous bits, confident that the same property will apply for those sets. As one further sorts based on progressively lower sets of significant digits, the original list becomes more and more sorted. When all sub-lists have been sorted, meaning the original list has been reduced to a single or multiple equal elements, on the lowest set of significant bits then the entire list has been properly sorted. The implication of this is that no matter what the value of N is for a list of length N, the number of times that N items are processed is a function of the number of bits in the encoding of the individual numbers, and the length of the list. Assuming K bits, then the time complexity of this process is O(NK). In modern computing, all items in a list use the same number of bits for encoding, thus K, for practical purposes, is a constant for any particular list. Thus the K drops out of the time complexity as being negligible as N approaches infinity, and it leaves O(N).

This counting addition can thus create "buckets" of a size relative to how many times each bit configuration appears in the list. Knowing the start of the next set (or "bucket") in a list also lets the algorithm potentially know the end of the previous bucket. If one adds in an "extra" pointer at the end of each bucket and has it advance backwards, one can sort based on one more bit lower down than one had counted with. This would be similar to sorting on the first bit of a set of items when the algorithm only knows the length of the list. One pointer starts on the left, another on the right, and they advance and trade items until they meet, similar to Quick Sort.

When each bucket has been filled with elements corresponding to the bit configuration it represents, then the next level of sorting could be kicked off then, instead of waiting for the whole sub-list to be sorted. This would result in loss of the ability to consistently sort to the smallest or largest values first, but would speed up when the initial set of final locations for some values would be known. This configuration may have merit for gambling or display purposes. A random or semi-random list sorted in this manner could be used as a contest to place wagers on as to what number or numbers will be in the first or subsequent sets of numbers to be finished sorting. In entertainment media it is not uncommon for an empty or unknown list to be slowly sorted with seemingly random values along the list becoming visible in a nonlinear fashion. This configuration of the algorithm could provide such an effect.

In addition, this algorithm can be executed linearly or recursively, with the typical tradeoffs in use of computing resources and time efficiency that accompany each choice.

Figure 2A:
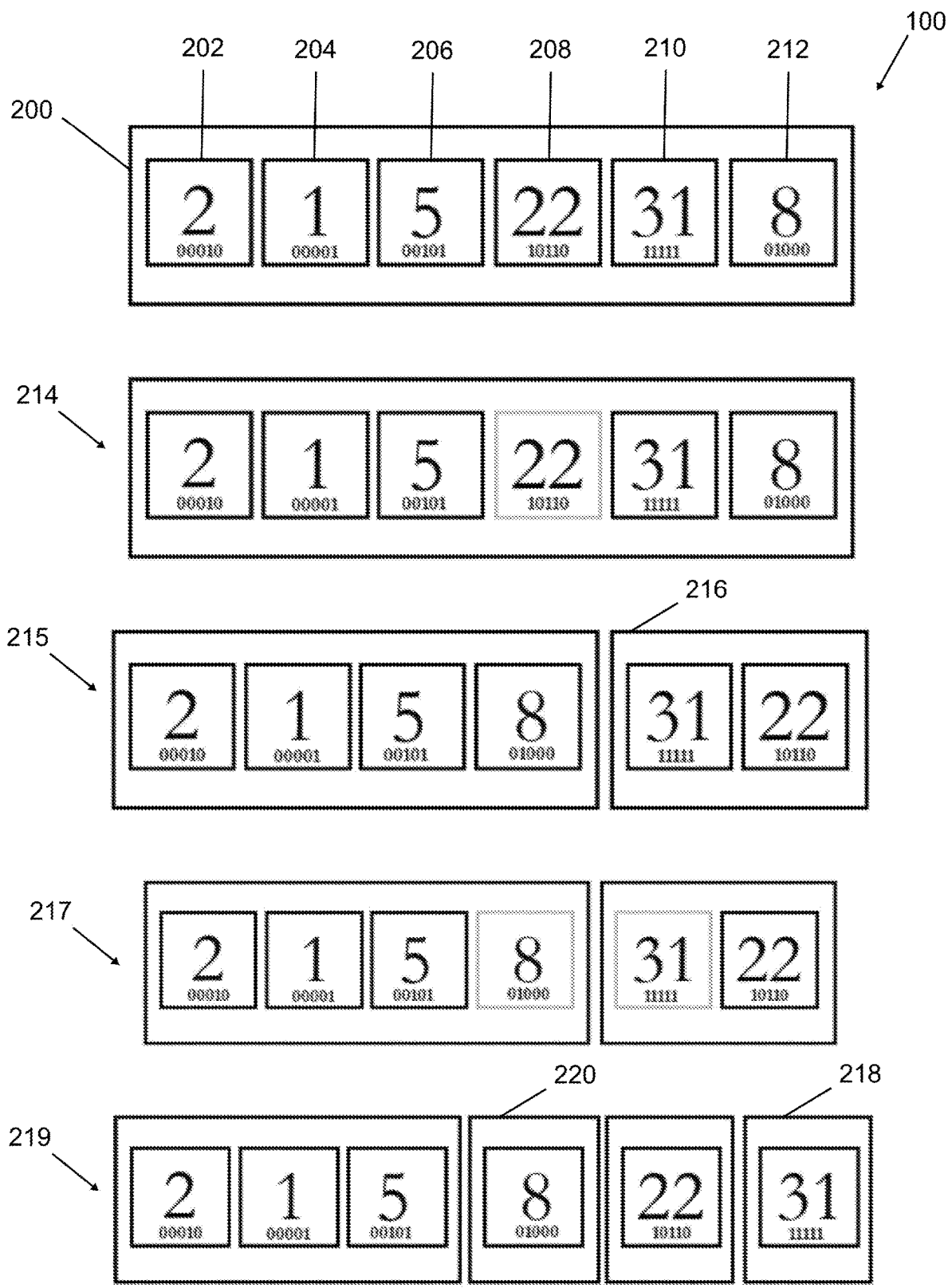
FIGS. 2A-2C shows the sorting process for a sample list of six elements being sorted by the sorting algorithm according to an embodiment of the invention.
Figure 2B:
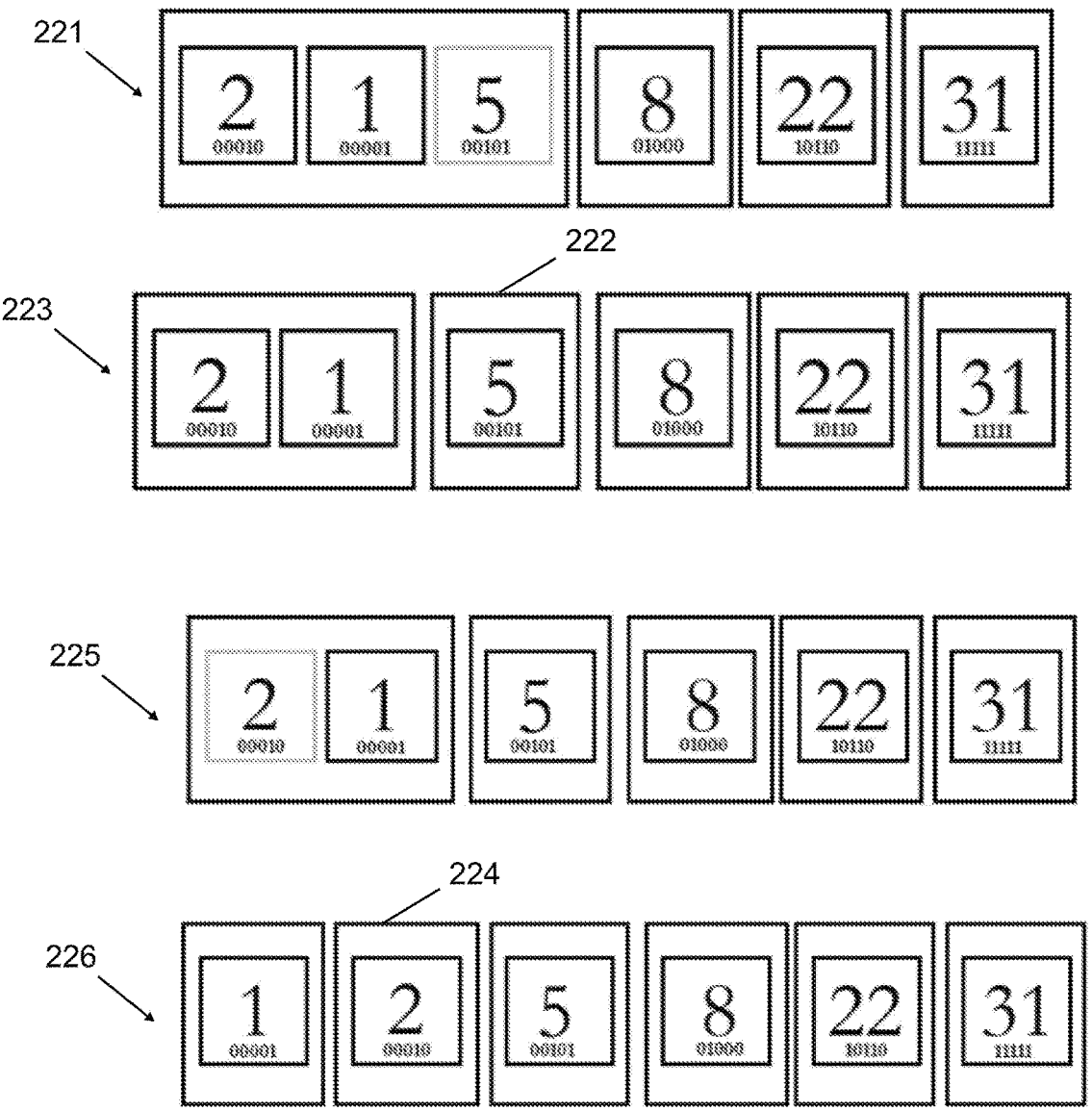
Figure 2C:
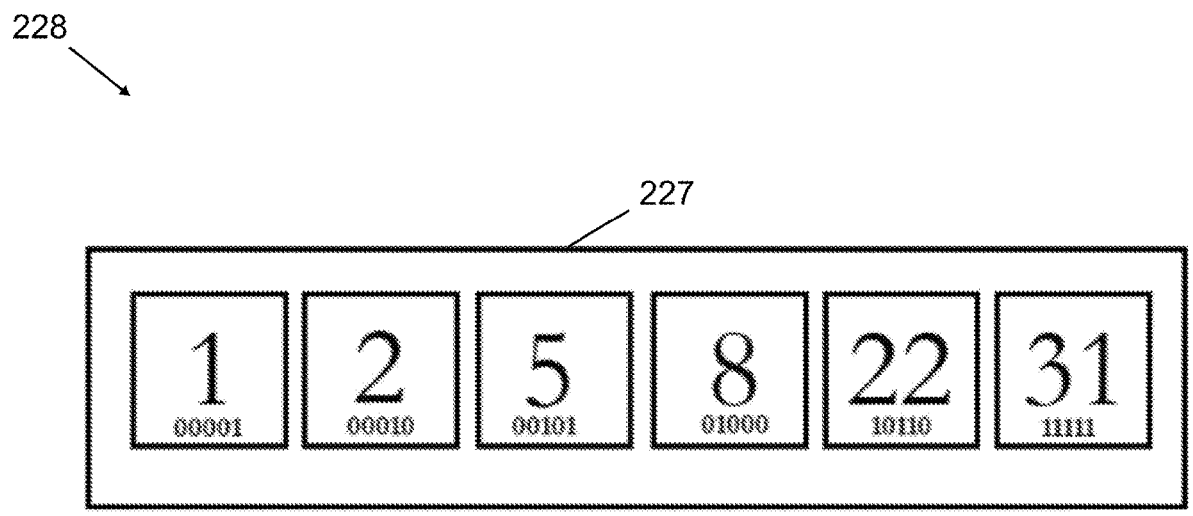

FIGS. 2A-C (collectively FIG. 2) is an example of the algorithm 100 in process through a simplified sample array of whole integers. The algorithm 100 begins with an unsorted list 200 of elements 202, 204, 206, 208, 210, 212 which in this case is comprised of the elements 2, 1, 5, 22, 31, and 8 encoded into five orders of bits with the rightmost bit being the high order and the leftmost being the low-order bit such that a number with each bit active would be 31, and a number with each bit inactive would be 0, and the bits, in order from left to right, represent the values of 16, 8, 4, 2, and 1 respectively. In the present invention, a pointer begins moving from left to right, though the direction is provided solely for interpretive purposes and is not a restriction of the system, and looks for an element with the high-order bit set active. In the present example, it first encounters the element corresponding to the value 22, element 208, wherein the high-order bit is active as demonstrated in step 214. The algorithm 100 then creates a sub-list 216 and moves the element representing 22 to its end. The algorithm 100 then proceeds through the original list again, encountering the element with the value 31, element 210, which also has a highest-order bit active (as the pointer is tracking the highest order bit), and as shown in step 215, moves it to the beginning of sub-list 216.

Now the process repeats for the next step 217 by spawning a second copy of the algorithm for the sub-list and running itself on the original unsorted list 200. The algorithm 100 reduces the bit order the pointer is inspecting by one, so it is looking for an active bit one order bit lower than the high-order bit, in this case the bit representing a value of 8. The algorithm 100 begins looking at both the original unsorted list 200 and the sub-list 216. The algorithm encounters the element with the value 8, element 212, and the element with the value 31, element 210, as each has an active second highest order bit. The 31 element 210 is moved to a new sub-list 218 to the right of the first spawned sub-list 216 as shown in step 219, while the 8 element 212 is moved to a new sub-list 220 left of the first sub-list.

The process repeats on the original unsorted list 200 and all the created sub-lists 216, 218 and 220, creating new copies of the algorithm for each list, and reducing the order of bit it is examining by one, so that it now examines the third bit in the series. In the unsorted original list, the pointer encounters the element with the value 5, element 206, which has an active third bit as shown in step 221. Like in the prior iterations, it moves to the value 5 element 206, to a new sub-list 222 positioned left of all previous sub-lists 216, 218, and 220, but right of the unsorted original list 200 as demonstrated in step 223. The spawned versions of the algorithms also encounter activated bits in the sub-lists 216 and 218 for the 22 and 31 elements, 208 and 210 respectively, but as those lists are lists comprised of one element, zero elements, or equal elements, the algorithm knows that they are by definition sorted and does not need to move them. In some embodiments, the algorithm may check a list of equal value elements, while in others it can be configured to remember when lists of equal value elements have been created.

The process of moving the 5 element 206 to the sub-list 222 also creates a new instance of the algorithm to potentially run on that sub-list; while in some embodiments it may be configured to notice that it has created a single element list by the end of its runtime and may terminate due to a single element list being sorted by definition.

For the fourth iteration, the algorithm reviews the fourth highest order element, the bit corresponding to a value of 2, and immediately encounters the element with the value 2, element 202. As before, the algorithm creates a new sub-list 224 and moves the 2 element 202 to that sub-list 224 as indicated in steps 225 and 226. For the other instances of the algorithm running on other lists, they also encounter the 22 element 208 and 31 elements 210, but as before, do not operate on them because they are by definition sorted. With the 2 element 202 moved, all six elements now occupy six single-element lists 200, 216, 218, 220, 222, and 224 as shown in step 226. By definition each of these single element lists is sorted, so the algorithm can recombine them, in their current order, into a single array 227 that is also sorted as shown in step 228.

In order to sort a list using the algorithm, the list to be sorted needs to be in the form of an array, and in some embodiments the length of the array must be known in advance. The items in the array need to be logically encoded in a standard binary format consistent across the values in the list without interdependence between values.

The algorithm sorts the list by using "levels" of contiguous bits from most significant to least significant for the individual items in the array. While there is no requirement that the same number of bits be used in each level, that practice will be assumed in order to simplify the examples herein. In some embodiments, the elements may not all utilize every single bit, and a practitioner skilled in the art could readily adjust an implementation to compensate for such loss by initially having the algorithm treat elements without certain levels of bits as having inactive bits. In some examples, multiple bits may be examined at the same time. Using the example from before, if the elements are {0011} and {0100} the algorithm could instead partially examine the first two bits, the 00 and 01 respectively, and sort accordingly such that a "11" bit pair is treated as the highest value and placed on the rightmost (for simplicity, higher values are being placed on the right) list, the "10" on the next highest, the "01" on the third highest, and the "00" on the lowest value sub-list.

Each level of sorting assumes the value of the item is temporarily the equivalent value of the set of bits being sorted on. For example, if sorting on 2 bits at a time a set of 4-bit numbers, and there was a need to sort 3 (represented as {0011}) and 4 (represented as {0100}) by their 2 most significant bits, then one would be sorting them with the respective values of 0 from the "00" component of (0011) and 1 from the "01" component of (0100) as derived from the active bits examined in the first, or highest order, pair.

As stated previously the algorithm uses the fact that all numbers whose one set of most significant bits is greater than the set of most significant bits of other numbers are also of greater total individual value of all individual values of the other numbers. This is irrespective of the value of the lower sets of bits. Thus 12 {1100} is greater than all numbers one less in the $2^{nd}$ most significant digit: 11 {1011}, 10 {1010}, 9 {1001}, and 8 itself {1000}. The algorithm can rely on this fact to ensure that active higher order bits result in the sub-lists created containing elements with those active higher order bits are higher than those without the active higher order bits.

The process of subdividing can be advanced by noting that, for a given set of bits, there is a sorted order for each pattern of bits. Such as the values 00, 01, 10, and 11 will be sorted ascending in that order no matter where in the process they are found. Thus, if one knows where in the sub-list the full set of numbers with each of those patterns should reside, one can sort to those numbers into those locations without regard to any ordering within the numbers having the same pattern at the level being sorted. As a result all numbers with 00 will be before all numbers with 01, and so on.

Figure 3:
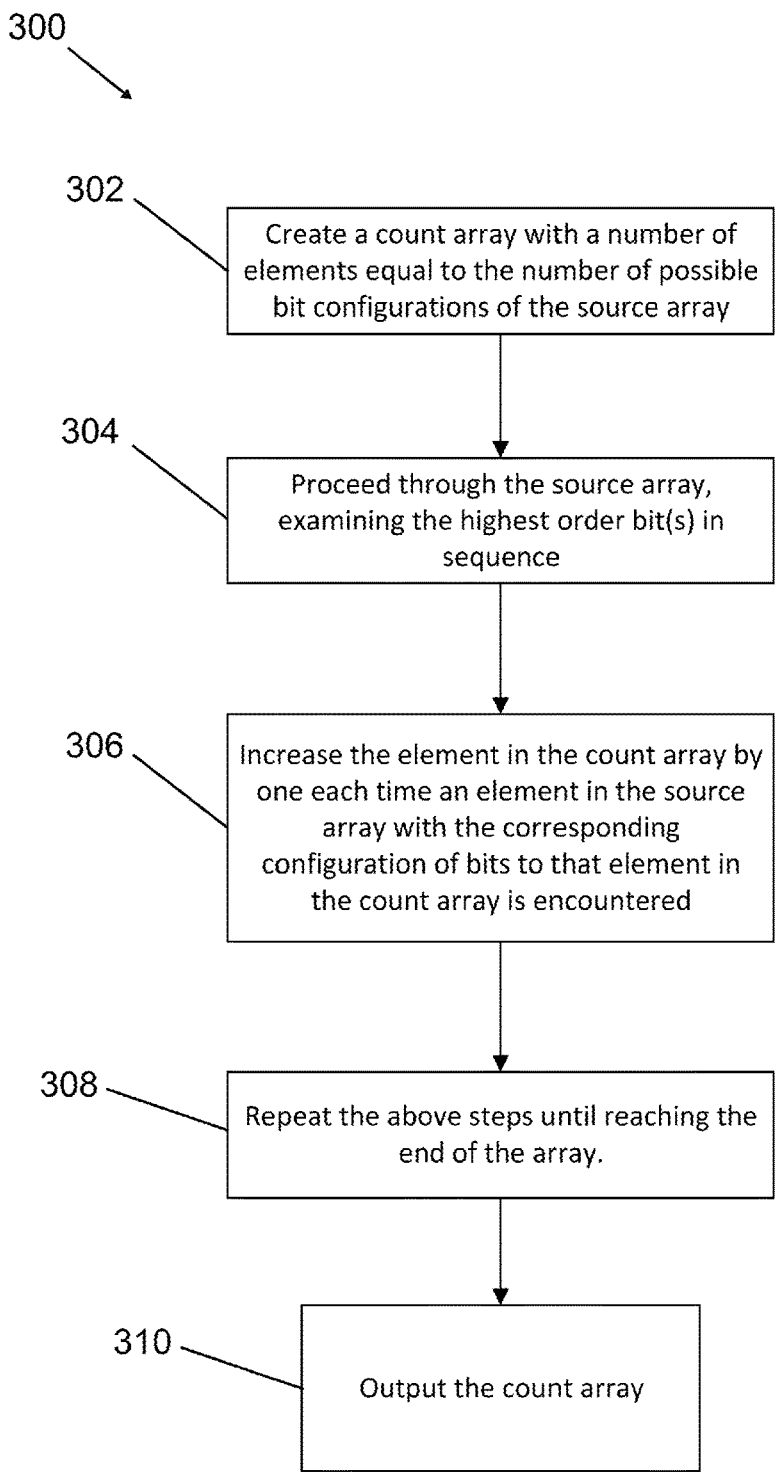
FIG. 3 is a flowchart showing the bit counting process of a sorting algorithm according to an embodiment of the invention.

FIG. 3 is a flowchart showing the bit counting process of a sorting algorithm according to an embodiment of the invention.

In some implementations of the algorithm, counting the number of elements in a list containing the same pattern of bits in the same location in each value enables one to improve the ability to move values closer and closer to their final location in the sorted final list. This technique has an advantage whereby the sorting is done by copying values within the original array. However, it is also possible to dispense with copying values partially or entirely in order to generate a sorted copy of the original list.

The basics of a counting sort 300 is to count the number of instances of each number in a list. These counts may be kept in another list, such as an array the size of the maximum range of the numbers being sorted as shown in step 302. In cases where the numbers being sorted are attached or associated with other data, it is can be useful to keep the original ordering when the final sorted list is created. If there are three elements with the value "12", then the order they appear in the original list when apart or together may need to be maintained when they appear together in the sorted list. Additionally, the original values along with their attachment to additional data would generally need to be copied to their new locations. If a particular implementation does not require the order of the elements be preserved, then the sorting can be simplified.

In simplified terms, the count sort 300 proceeds by creating a count array with a number of elements equal to the number of possible bit configurations; the square of the number of bits being examined, as shown in step 302. The sort then utilizes a pointer or similar tracking mechanism to proceed sequentially through the array, examining the highest order bit(s) as configured as shown in step 304, and increasing the element in the count array by one each time the count array element's corresponding bit configuration is encountered in the source array as shown in step 306. The process repeats through the entire array, step 308, and as output can provide the system or a user with the count array, step 310.

If one were to know how many copies of each individual number exist in a list, in a sorted order, then it would be simple to build a new list from that information. The problem with this approach until now is that the "counting" list could easily be larger than the original list. What the counting component of the algorithm does is count based on portions of the values, with a bias towards completing the count of the smaller (or larger) numbers earlier in the process. Thus, the full count of the numbers are completed first, and can be written out to an output list (of the same size as the original) before moving on to the greater numbers. Since the previous numbers have been fully dealt with, the space used to count those numbers can be reused to finish counting the next larger numbers.

When operating at each level the algorithm is given a few key pieces of information: the pattern of bits "above" the pattern to be used for counting, the number of instances of that "above" pattern to be found, the location of the original array being sorted, and for the lowest level instance the location of the output array. In addition, because the counts are known, it is possible to also pass the starting index of a grouping of values, such that the algorithm can be run in parallel.

The count sort component can be implemented independently, or as a supporting function of the existing binary examination sorting.

For a non-optimized example, the count sort could operate as follows. Take four 8-bit values, dividing the values into 2-bit segments for the purposes of counting. An input array of 4 positive values {255, 132, 18, 255}. In binary form, the arrays appears as {11111111, 10000100, 00010010, 11111111}. Create an output array of the same size of the input array {0, 0, 0, 0}.

For each pass at a particular level, create a counting array of a number of elements equal to 2 to the power of the number of bits in that pass. In this case the number of bits will always be 2, so the counting arrays will always have a length of 2 to the power 2, which equals 4, so the counting array will start as {0, 0, 0, 0}.

Because this is the first pass, the number of elements to be counted is equal to the length of the original array to be sorted. The pattern of bits "above" the patterns being counted in this iteration are effectively blank, and superfluous for the first iteration. The algorithm will work with 2 bits at a time at 4 levels. For counting purposes, the algorithm only needs to "see" the relevant set of (2) bits from within the value. Thus, the input array values would be counted by the first 2 bits, and the number of instances is put into the appropriate indices of the counting array being used for that level. The 2-bit values from the input array would appear as {11, 10, 00, 11}, which in digital form would be {3, 2, 0, 3}. The underlining below will show the values as they are processed by the algorithm:

Input: {<u>11</u>, 10, 00, 11}→Counting: {0, 0, 0, 1}
Input: {11, <u>10</u>, 00, 11}→Counting: {0, 0, 1, 1}
Input: {11, 10, <u>00</u>, 11}→Counting: {1, 0, 1, 1}
Input: {11, 10, 00, <u>11</u>}→Counting: {1, 0, 1, 2}

Please note that the index for each element in the counting array matches the binary value of the bit pattern being counted at that index.

In some embodiments, once the original list has had its elements counted into the counting array, the algorithm goes through the counting array and writes any single value count into the output array calls another instance of the algorithm for each element that has a value greater than 0. This allows it to count and potentially sort lower orders of bits.

Figure 4:
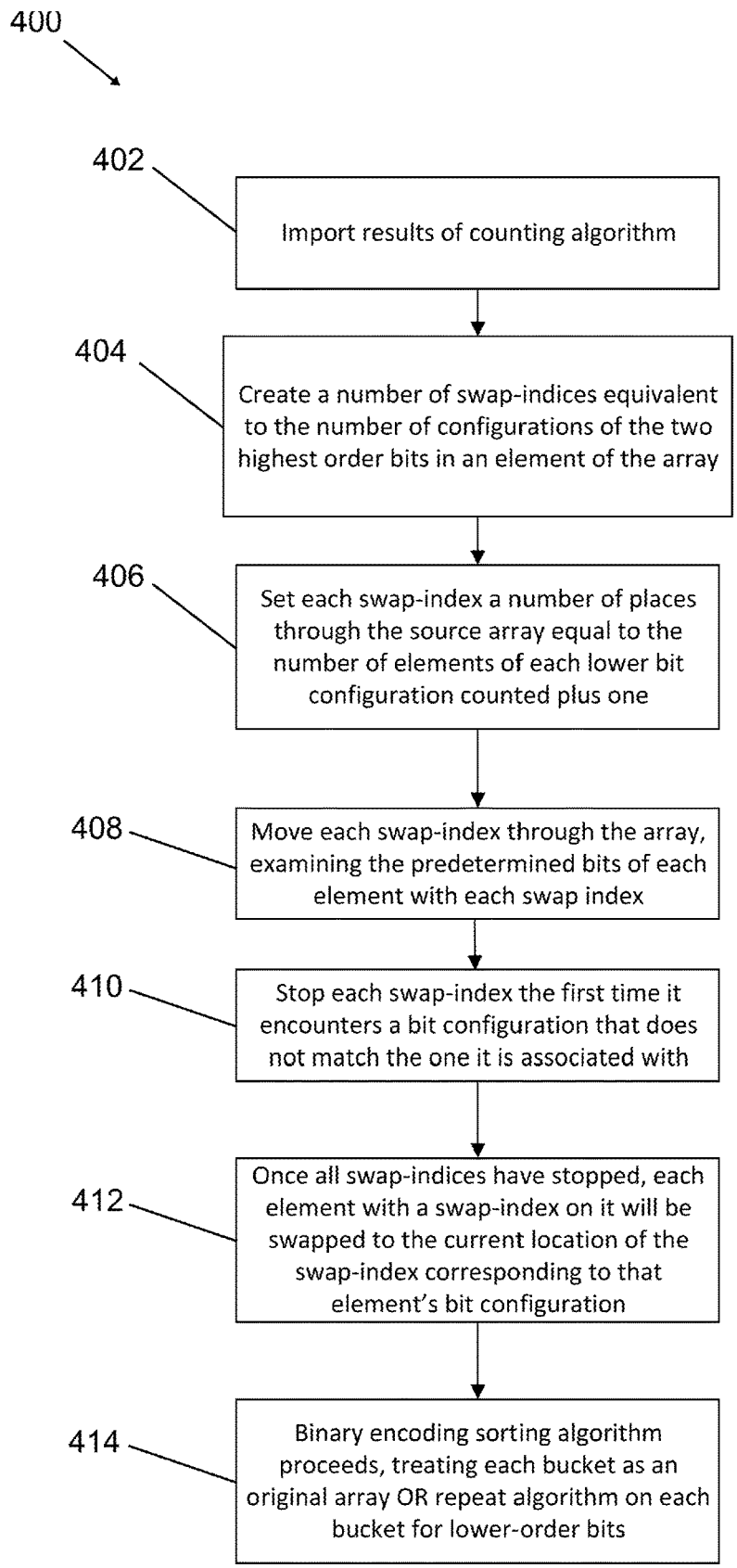
FIG. 4 shows a swap-index component that may be implemented with the binary sorting method, in accordance with an embodiment of the invention.

FIG. 4 shows a swap-index component that may be implemented with the binary sorting method, in accordance with an embodiment of the invention.

When implemented with a swap-index system 400, the counting method can also function as a sorting means. First, the system goes through the counting sort algorithm as in step 402, described in FIG. 3, resulting in an array with a number of elements equal to the number of possible bit configurations of the number of bits being examined, which is also the square of the number of bits being examined. For example, if the system 400 is examining two bits, then the possible configurations are 00, 01, 10, and 11, resulting in four swap-indexes and four bucket sub-lists. In some embodiments, the system may be configured to not create a swap-index for any configuration whose count was zero.

In such cases, the system may create a "swap-index" for each possible configurations of bits being examined in step 402, as shown in step 404. The swap-indexes begin at an element a number of places in equal to the total number of elements in the preceding buckets. For example, if the possible configurations are 00, 01, 10, and 11, and there are three elements with a 00, four with a 01, one with a 10, and two with a 11 configuration, then the swap-index for the 11 configuration will start at the 9th place in the array, the swap-index for the 00 configuration will start at the $0^{th}$ place in the array, the 01 swap-index will start at the 4th position in the array, and the 10 swap-index will start at the 8th position in the array as shown in step 406. The swap-indices can further be configured to only proceed until they reach the known end of their bucket sub-array, which would be one less than the starting position of the swap-index that follows them. So in the preceding example, the 00 swap index would be configured to end at the $3^{rd}$ position in the array.

Each swap-index will then advance one at a time from left to right as shown in step 408. Then the system will also create a number of "bucket" sub-lists equal to the number of possible configurations of bits being examined and associated with the corresponding swap-index for each configuration, with each bucket sub-list starting at the same position as its associated swap-index.

The advancement will temporarily stop when the swap-index is at an element that does not belong in that bucket as shown in step 410. Once all active swap-index values have advanced to either an element that does not belong, or past the end of the bucket, then the moving of elements will commence. Please note this important feature: the bit(s) used to count in the previous iteration, and now to sort in this iteration, when taken independently of the original value from whence they came, represent a numeric value that matches the bucket to which the value they reside in need to be sorted. In the case of a 2-bit counting mechanism, it would be a 2-bit numeric value.

Once all swap-indices have "stopped," or reached a value different from the bit configuration each is looking for, the values will be sequentially moved to the current location of their "home" bucket's swap-index, or the bucket that is associated with a bit configuration that matches the bit configuration of the element as described in step 412. In the case where two buckets' swap-indices are on values belonging in the other, then a simple swap can occur and both swap-indices can be advanced to the next unwelcome value or past the end of their section. In the case where multiple swap-indices are on values belonging to the same other bucket, then the values can be swapped in intelligently, one at time, advancing the receiving swap-index properly after each, potentially using a temporary holding variable for any "orphan" values that do not currently have a spot clear for them to go into.

The exact details of the swapping procedure are subject to optimization for the specific circumstances of the execution of the algorithm. These details are easily decided by a person knowledgeable in the field of computer science. One of the primary advantages of this technique is that the compared part of the value also exactly identifies the bucket in which it must arrive. There is no need to create or associate a separate value to represent that bucket to the original value to be sorted. In some embodiments, the algorithm can then proceed with the original binary encoding sort algorithm described above, treating each bucket as a source array as shown in step 414. Alternatively, the swap-index system can repeat, examining lower-order configurations of bits within each bucket.

Example and Explanation of Python Implementation and Sorting Method

FIGS. 5A-E, (collectively FIG. 5) comprise source code for an implementation of a binary encoding bit sorting algorithm combined with the additional counting feature, in accordance with an embodiment of the invention. The included code is provided only as an example implementation, not an exhaustive version. For the purpose of the example, several variables and functions have been defined, as discussed below.

The currentPointer is a single value holding the ordinal of the pointer currently being worked with.

The Pointers array is a one-dimensional array of size equal to the maximum value represented by the number of bits being sorted on, holding the current locations into the list being sorted for each pointer. As a note, for convenience purposes for this example, the value for each pointer in this array will be the current index of the pointer, save for the case where the pointer has gone past the end of its own bucket. In that case the value will be set to −1 as an indicator that this pointer is no longer in use for sorting for this iteration. Note that currentPointer is used as an index into the Pointers (as well as Next and Prev below) array. The value in Pointers[currentPointer] is the index into the original list being sorted at which currentPointer is pointing.

The oldCounts array is the same size as the Pointers array, and holds the counts for the set of bits being sorted on at this level, and this information is used to summatically both initialize the Pointers array and create the Ends array. A summation value is created that equals the first of the oldCounts ([0]) fields plus the beginning index of the (sub)list being sorted. For the first level, the beginning index is 0. The first value of the Pointers array ([0]) is set to this value. The summation value has added to it the first field of the oldCounts array, and then the first field of the Ends array is set to that value. Repeat until all values in Pointers and Ends have been set. The result is Pointers starting at a 0 offset from the beginning of the section of the original list that is being sorted, and Ends has as its last value one past the index of the last value of the original list that is being sorted. In between, the summation count fills both arrays, with the value at any particular index (after 0) of Pointers having the same value as at that index minus one of Ends.

The Next, and Prev arrays are each the same size as the Pointers array, and are necessary for resolving trading values between pointers. For convenience purposes, the default value of the elements of these arrays is −1, which indicates the value for that particular pointer is not set.

The newCounts is a two-dimensional array with the first dimension equal the size of the Pointers array, and the second dimension equal to a size equal to the maximum value represented by the number of bits being counted on. For this example, the number of bits counted on will consistently match the number of bits being sorted on, but that is not a required choice in the general case of sorting a list.

arrList is the one-dimensional list of values to be sorted.

IntraValue is the term coined to refer to the value of a contiguous set of bits from within the full set of bits used to represent a value in the list to be sorted. These bits are treated as if they were the only bits in a value, for example, 011000 using the middle pair of bits an IntraValue of (binary) 10, decimal (4) would be obtained.

Upperintra value will refer to the set of bits being sorted on.

Lowerintra value will represent the next lower distinct set of bits (adjacent to those used for IntraValue) being counted on.

numBits is the number of bits used for sorting and counting in this example. For this example its value is always 2.

lsb is a value representing the number of bits remaining below the level being sorted's Upperintra value bits. The Upperintra value is evaluated at the bits starting (from the left) one greater than lsb. To begin with, lsb in this example will be 4. Similarly, Lowerintra value is evaluated at the next numBits below where Upperintra value is evaluated. This is to accommodate using a mask and bit shift operations to obtain IntraValues, but that is an implementation detail that is not strictly necessary in order to understand the algorithm. What is key, though, is that by lowering the value of lsb by numBits for subsequent levels of sorting lsb eventually becomes equal to 0 for particular iterations of the algorithm, and that is an indicator that only sorting of the last bits of the values is necessary and trying to count below those bits is pointless.

Exemplary Computing Device

Figure 6:
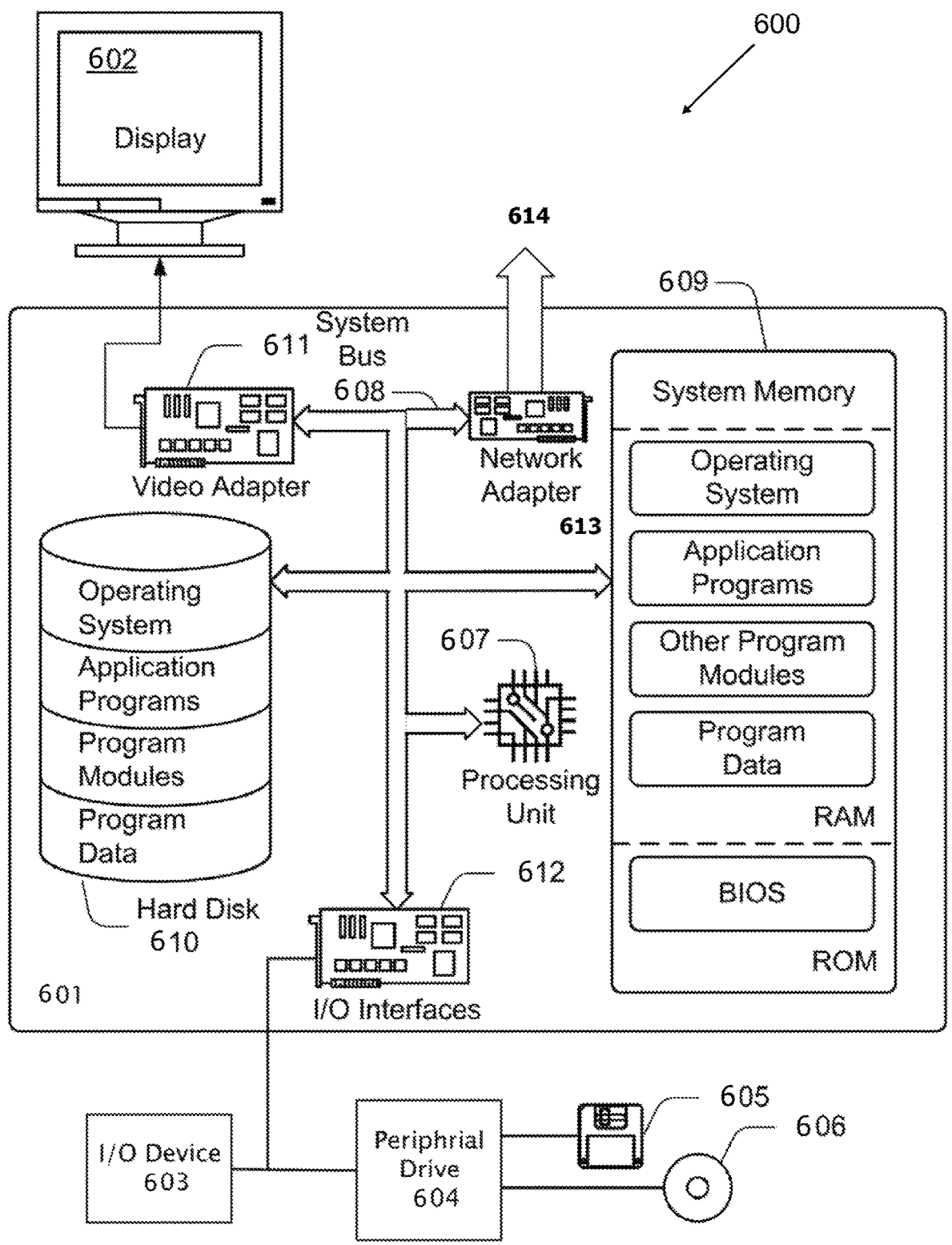
FIG. 6 is an example of a computing system and network upon which the sorting algorithm may be implemented.

FIG. 6 is an example of a computing system upon which the new sorting algorithm may be implemented. Exemplary computing environment 600 is only one example of a computing system and is not intended to limit the examples described in this application to this particular computing environment.

For example the computing environment 600 can be implemented with numerous other general purpose or special purpose computing system configurations. Examples of well known computing systems, may include, but are not limited to, personal computers, hand-held or laptop devices, tablets, microprocessor-based systems, multiprocessor systems, cellular telephones, PDAs, and the like.

The computer 600 includes a general-purpose computing system in the form of a computing device 601. The components of computing device 601 can include one or more processors (including CPUs, GPUs, microprocessors and the like) 607, a system memory 609, and a system bus 608 that couples the various system components. Processor 607 processes various computer executable instructions, including those to implement the algorithm and to control the operation of computing device 601 and to communicate with other electronic and computing devices (not shown). The system bus 608 represents any number of several types of bus structures, including a memory bus or memory controller, a peripheral bus, an accelerated graphics port, and a processor or local bus using any of a variety of bus architectures.

The invention algorithm may, in some embodiments, utilize a "look-ahead" mechanism to compare and count patterns of bits, and then uses those same patterns to route values to the correct subsets for the pertinent level of sorting.

Since the number of bits used in a standard computer system is known at time of manufacture, and is permanent for the life of the processors used in the computer, it is possible to do hardware level optimization specifically, albeit not necessarily exclusively, for the algorithm.

Normally, a contiguous subset of the bits used in a value are evaluated as if they were an independent number in and of themselves. When such a grouping of bits is retrieved from a value, when they are not the last and least significant bits of that value, they have to be "translated" into the equivalent of the number they would represent independently of the value from which they were extracted. By creating special instructions in the gate-logic of a computing device 601, it is possible to bypass the "translation" step. Such could also be implemented into the construction of the processor's 607 register, wherein the specific gates could be part of its memory.

Normally, any kind of copy operation is done on a whole value with each bit being faithfully copied to the same relative location within the bits of the copied-to location. By specifically copying a contiguous subset of bits to the lowest values in the copied-to location, the new value at the copied to location will be the desired value already.

For example, given a value of "11011", the integer "25", and an embodiment of the algorithm consistently using 2-bits for counting, would be a need for (from left to right, starting with 0) bits 1 and 2 ("10") and for bits 3 and 4 ("11").

Dedicated logic-gates implemented in the computing device 601 would have an instruction to copy bits 1 and 2 to a new value. Another instruction would copy bits 3 and 4 to a new value. These instructions would be independent, and at a low level implemented as part of the instruction set of the computing device 601.

The exact ordering of the bits would be up to a designer of the relevant chip. A practitioner skilled in the art could instead structure a chip with the bits out of order, or in a different order, and the present invention could be adapted thereto. In other words, the algorithm could be adapted to any binary architecture.

The system memory 609 includes computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 607.

Mass storage devices 604 may be coupled to the computing device 601 or incorporated into the computing device by coupling to the bus. Such mass storage devices 604 may include a magnetic disk drive which reads from and writes to a removable, non-volatile magnetic disk (e.g., a "floppy disk") 605, or an optical disk drive that reads from and/or writes to a removable, non-volatile optical disk such as a CD-ROM or the like 606. Computer readable media 605, 606 typically embody computer readable instructions, data structures, program modules and the like supplied on floppy disks, CDs, portable memory sticks and the like.

Any number of program modules can be stored on the hard disk 610, Mass storage devices 604, ROM and/or RAM 609, including by way of example, an operating system, one or more application programs, other program modules, and program data. Each of such operating system, application programs, other program modules and program data (or some combination thereof) may include an embodiment of the systems and methods described herein.

A display device 602 can be connected to the system bus 608 via an interface, such as a video adapter 611. A user can interface with computing device via any number of different input devices 603 such as a keyboard, pointing device, joystick, game pad, serial port, and/or the like. These and other input devices are connected to the processors 607 via input/output interfaces 612 that are coupled to the system bus 608, but may be connected by other interface and bus structures, such as a parallel port, game port, and/or a universal serial bus (USB).

Computing device 600 can operate in a networked environment using connections to one or more remote computers through one or more local area networks (LANs), wide area networks (WANs) and the like. The computing device 601 is connected to a network 614 via a network adapter 613 or alternatively by a modem, DSL, ISDN interface or the like.

The functionalities described herein are not envisioned to be tied to any one communication protocol, programming language or the like, and may be implemented in any convenient form of coding, computer language or the like where called for to implement a particular function in the algorithm.

Those skilled in the art will realize that the process sequences described above may be equivalently performed in any order to achieve a desired result. Also, sub-processes may typically be omitted as desired without taking away from the overall functionality of the processes described above.

While the above example of a computing environment is one possible implementation, those skilled in the art could also attempt to implement the present invention in nearly any environment capable of implementing a computer, such as in a suitably programmed video game or utilizing a mechanical implementation. For example, practitioners have created virtual "computers" in popular sandbox video games such as Minecraft, and, given the proper tools, could implement this invention in such a game, or in other media.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

What is claimed is:

1. A computer implemented method for sorting an array comprised of a plurality of elements, the method comprising the steps of:
receiving a sort request from a requesting user that includes one or more sorting criteria for the array comprised of a plurality of elements, wherein the elements are stored in memory that is accessible by a computer processor and wherein the elements are comprised of one or more bits that may be active or inactive;
instructing the processor to run a sorting algorithm to sort the elements from a first order to a second order wherein the second order is a sorted array, wherein the elements are sorted dependent on the sorting criteria and the sorting of the elements is performed by examining binary encoding of the elements;
running the sorting algorithm to sort the array of elements in a memory, wherein the sorting algorithm comprises the steps of:
creating a plurality of swap-indices equal to the square of the number of bits to be counted with each swap-index being associated with one configuration of bits;
moving the plurality of swap indices sequentially through each element, and stopping each swap-index at any element with a configuration of bits that is different from that of the swap-index:
move the element on which a swap-index stopped to the position in the array occupied by its current proper swap-index, the swap-index with a matching bit configuration;
setting a pointer to a value equal to the value of a highest bit encoded for each element;
moving the pointer in sequence through the array and examining a bit in each element of an order equal to the current value of the pointer until encountering an element where the current bit is active;
creating a new sub-array, if one has not already been created for the current pointer value;
moving each element encountered by the pointer with the active hit of an order equal to the value of the pointer to a beginning of the new sub-array;
continuing through the array elements and moving each element encountered where the first bit is active to the end of the new sub-array.

2. The computer implemented method of claim 1, wherein the method for sorting an array of elements further comprises the step of:
repeating the preceding steps in the array, on all previously created new sub-arrays, and on all created new sub-arrays for a given cycle for elements where a Slower order bit is active.

3. The computer implemented method of claim 2, wherein the method for sorting an array of elements further comprises the step of:
repeating the preceding steps for any subsequent lower order bits until all bits have been examined.

4. The computer implemented method of claim 2, wherein the repeating the preceding steps in the array step further comprises:
ceasing repetition of the algorithm if all sub-lists are comprised of a single element or solely of duplicate elements.

5. The computer implemented method of claim 1, wherein the method for sorting an array of elements further comprises the step of:
combining all created new sub-arrays into a single array based on the new sub-arrays' order of creation.

6. The computer implemented method of claim 1, wherein the sorting algorithm further comprises the steps, that occur before the other steps in the sorting algorithm, of:
moving through the array and examining at least one bit of each element in the array and increasing the value of the element in a counting new sub-array corresponding to a configuration of the first bit and the second bit each time the configuration is encountered.

7. The computer implemented method of claim 6, wherein the sorting algorithm further comprises the steps, that occur before the other steps in the sorting algorithm, of:
creating a plurality of bucket sub-lists equal to the number of configurations possible for the bits being counted and associate one sub-list with each bit configuration;
moving each element to the beginning of the sub-list associated with the bit configuration that matches the element's bit configuration.

8. The computer implemented method of claim 1, wherein the method for sorting, an array of elements further comprises the step of:
reducing the pointer value by one and repeating the algorithm starting at the move step until the pointer value is lower than a lowest bit encoding each element.

9. The computer implemented method of claim 1, wherein the running the sorting algorithm step further comprises:
Creating a new instance of the sorting algorithm that repeats the sorting algorithm steps on each new sub-array.

10. The computer implemented method of claim 1, wherein the elements are all binary encoded positive integers encoded by one or more bits.

11. The computer implemented method of claim 1, wherein the sorting algorithm further comprises the step, that occurs before the other steps in the sorting algorithm, of:
performing the swap-index steps on each bucket sub-list simultaneously.

12. A non-transitory computer-readable storage medium having stored therein a computer program comprising code which when executed on a computer will:
access a source array of elements, wherein each of the elements is encoded by one or more bits stored in memory;
examine the one or more bits of each element in sequence, starting with a highest order bit;
upon encountering an element with an active bit in the order currently being examined create a sub-list for that order of bits if one has not previously been created for the order being examined and the array or sub-list being examined, and move the element with a bit encoded as active to a sub-list for that order of bits;

repeat the examine, create, and move steps for the source array and each of the sub-lists until the lowest order bit in each of the elements has been examined and the element has been moved;

combine the created sub-lists into a new array in the reverse order in which they were created;

create a plurality of swap-indices equal to the square of the number of bits to be counted with each swap-index being associated with one configuration of bits;

move the plurality of swap-indices sequentially through each element, and stopping each swap-index at any element with a configuration of bits that is different from that of the swap-index:

move the element on which a swap-index stopped to the position in the array occupied by its current proper swap-index, the swap-index with a matching bit configuration.

13. The non-transitory computer-readable storage medium of claim 12, wherein the source array is stored in a database.

14. The non-transitory computer-readable storage medium of claim 12, wherein the computer is further comprised of one or more sorting specific logic gates configured to facilitate the examination step.

15. A computer system for sorting a source array that includes a plurality of binary encoded elements, the computer system comprising:

a sorting algorithm module that is stored in memory of the computer system, the sorting algorithm module being operable to convert an unsorted array of elements into a sorted array of elements;

a plurality of complex objects stored in memory of the computer system;

the unsorted array of elements stored in memory of the computer system, wherein the each of the elements includes a reference to one of the plurality of complex objects;

a processor that is operative to execute the sorting algorithm module; and memory that is operable to store the sorted array of elements;

wherein the sorting algorithm module comprising a sorting algorithm, the sorting algorithm comprising the steps of:

creating a pointer and setting its value equal to the maximum number of bits encoding any of the elements in the array;

moving the pointer through the array examining a highest order bit for each element;

creating a new sub-list for each order of bit being examined the first time an element with an active bit of an order equal to the value of the pointer is encountered;

and moving any element with a highest order bit set to active to the new sub-list corresponding to that order of bit; and reducing the value of the pointer by one and repeating the above process beginning at the moving the pointer step on all newly created and previously created sub-lists, until the pointer value is zero;

create a plurality of swap-indices equal to the square of the number of bits to be counted with each swap-index being associated with one configuration of bits;

move the plurality of swap-indices sequentially through each element, and stopping each swap-index at any element with a configuration of bits that is different from that of the swap-index;

move the element on which a swap-index stopped to the position in the array occupied by its current proper swap-index, the swap-index with a matching bit configuration;

wherein the sorting is performed by iteratively accessing the binary encoding of the elements in the memory.

16. A computer system for sorting a source array of claim 15, wherein the computer system is further comprised of one or more sorting specific logic gates configured to facilitate the moving the pointer step.

* * * * *